United States Patent
Nakao et al.

(10) Patent No.: US 12,454,059 B2
(45) Date of Patent: Oct. 28, 2025

(54) DETERMINATION DEVICE, SYSTEM, AND DETERMINATION METHOD

(71) Applicant: Panasonic Intellectual Property Management Co., Ltd., Osaka (JP)

(72) Inventors: Suguru Nakao, Hyogo (JP); Kei Tasaka, Osaka (JP); Yuki Iwamoto, Osaka (JP); Hiroshi Kunimoto, Osaka (JP); Takeshi Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 275 days.

(21) Appl. No.: 18/114,651

(22) Filed: Feb. 27, 2023

(65) Prior Publication Data

US 2023/0271327 A1    Aug. 31, 2023

(30) Foreign Application Priority Data

Feb. 28, 2022  (JP) ................. 2022-029955

(51) Int. Cl.
*B25J 9/16* (2006.01)
*B25J 15/08* (2006.01)
*G01H 17/00* (2006.01)

(52) U.S. Cl.
CPC ............. *B25J 9/1694* (2013.01); *B25J 15/08* (2013.01); *G01H 17/00* (2013.01)

(58) Field of Classification Search
CPC . B25J 9/1694; B25J 15/08; B25J 9/161; B25J 9/163; B25J 11/00; B25J 9/1628; B25J 9/1669; B25J 9/1679; G01H 17/00; G01H 1/00; G05B 2219/49054; G05B 2219/50041; G05B 2219/50137; G05B 2219/37434; G01M 13/00; G06N 20/00

See application file for complete search history.

(56) References Cited

U.S. PATENT DOCUMENTS

| | | | |
|---|---|---|---|
| 2009/0069942 A1* | 3/2009 | Takahashi | B25J 9/1633 700/260 |
| 2012/0248895 A1* | 10/2012 | Shimoda | B06B 1/0207 307/117 |
| 2014/0163737 A1 | 6/2014 | Nagata et al. | |
| 2014/0334056 A1* | 11/2014 | Im | H01H 47/002 361/170 |
| 2016/0011663 A1* | 1/2016 | Starner | G06F 1/163 345/169 |
| 2019/0291277 A1* | 9/2019 | Oleynik | B25J 9/1669 |
| 2020/0043306 A1* | 2/2020 | Taniguchi | G08B 7/06 |
| 2021/0148791 A1 | 5/2021 | Huang et al. | |
| 2021/0159815 A1* | 5/2021 | Kim | H02N 2/026 |
| 2022/0269284 A1* | 8/2022 | Chen | G06Q 10/06311 |

FOREIGN PATENT DOCUMENTS

| | | |
|---|---|---|
| JP | 6-8173 | 1/1994 |
| JP | 6482433 | 3/2019 |
| JP | 2021-79537 | 5/2021 |
| JP | 2021-94639 | 6/2021 |
| WO | 2013/027251 | 2/2013 |

* cited by examiner

*Primary Examiner* — Sze-Hon Kong
*Assistant Examiner* — Esvinder Singh
(74) *Attorney, Agent, or Firm* — WENDEROTH, LIND & PONACK, L.L.P.

(57) ABSTRACT

A determination device includes an interface configured to acquire a vibration signal generated when a position of an object is switched, and a controller configured to determine a state of the object using the vibration signal.

14 Claims, 11 Drawing Sheets

DETERMINATION DEVICE, SYSTEM, AND DETERMINATION METHOD

BACKGROUND

1. Technical Field

The present disclosure relates to a determination device, a system, and a determination method.

2. Description of the Related Art

Conventionally, various switches for performing various controls have been used in machines, facilities, and the like.

The switch is operated manually or by using a robot or the like. Whether or not the switch has been appropriately operated may be determined based on an image around the switch captured by using a camera.

For example, WO 2013/027251 A discloses a configuration in which a positional relationship with a component to be gripped at the time of operating a robot is determined using an image captured by a camera.

SUMMARY

However, there is a case where an image around the switch cannot be captured depending on a capturing condition such as a relatively dark place, or a state where it cannot be determined by an image. Therefore, a method for grasping the state of the switch by a method other than using a captured image is required.

The present disclosure has been made in view of the above-described conventional circumstances, and an object thereof is to provide a determination device and a determination method for determining a state of an object such as a switch based on a vibration signal at the time of position switching of the object.

A determination device according to the present disclosure includes an acquisition unit that acquires a vibration signal generated when the position of an object is switched, and a determination unit that determines the state of the object by using the vibration signal.

A system according to the present disclosure includes a determination device, a robot for operating an object, a sensor for detecting a vibration signal, and a controller for controlling the operation of the robot. The determination device includes an acquisition unit that acquires a vibration signal generated when the position of an object is switched, and a determination unit that determines the state of the object by using the vibration signal.

A determination method according to the present disclosure includes an acquisition step of acquiring a vibration signal generated when the position of an object is switched and a determination step of determining the state of the object by using the vibration signal.

Conversions among a method, an apparatus, a system, a storage medium, a computer program, and the like of any combinations of the elements described above and the expressions used in the present disclosure also valid as aspects of the present disclosure.

The present disclosure can provide a determination device and a determination method for determining the state of an object based on a vibration signal at the time of switching of the position of the object.

DETAILED DESCRIPTION

Some exemplary embodiments specifically describing a determination device and a determination method according to the present disclosure will now be explained in detail, by referring to the accompanying drawings as appropriate. It is noted that a more detailed description than need may be omitted. For example, detailed descriptions of a well-known matter or redundant descriptions of substantially the same structures may be omitted. This is to avoid the unnecessary redundancy in the following descriptions and to make the descriptions easier to understand for those skilled in the art. Note that the accompanying drawings and the following descriptions are provided for those skilled in the art to fully understand the present disclosure, and are not intended to limit the subject matter described in the claims.

In each of the exemplary embodiments described below, various types of switches will be described as examples of an object to be determined by the determination device. Therefore, in each determination to be described later, determination is made based on data obtained by operating the switch. However, the features according to the invention are not limited to being applied to switches. For example, in a case where there is a correlation between vibration information generated at the time of operation or at the time of state change and its details (operation or state change) thereof, and determination can be made on the basis of the correlation as in the exemplary embodiment to be described later, the present invention can be applied to an object other than the switch.

First Exemplary Embodiment

[System Configuration]

Figure 1:
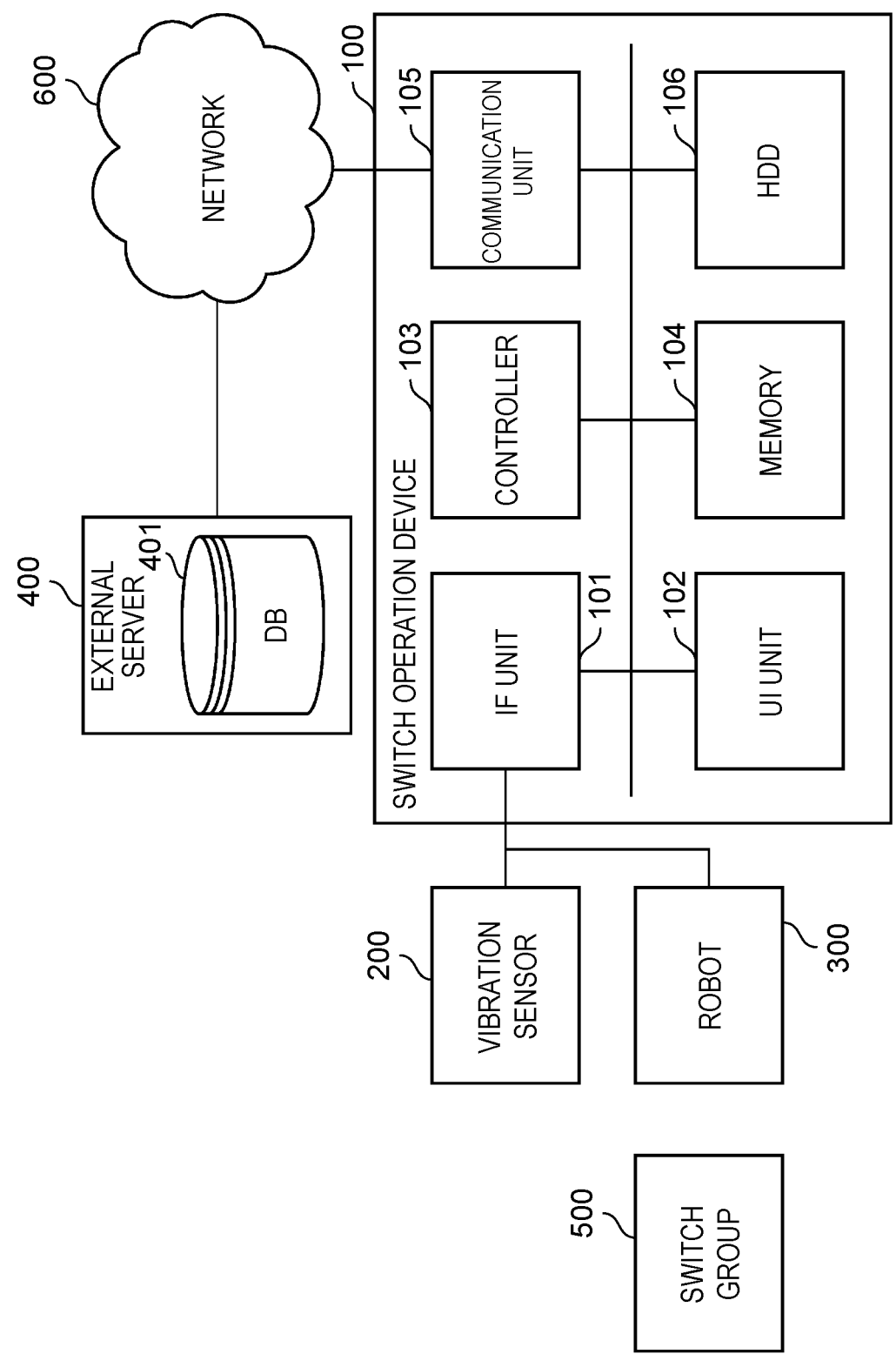
FIG. 1 is a block diagram illustrating an example of a system configuration according to the first exemplary embodiment.

FIG. 1 is a block diagram illustrating an example of an overall configuration of a system including switch operation device 100 according to the present exemplary embodiment. Switch operation device 100 is a device including the function of the determination device according to the present disclosure. Switch operation device 100 is connected to robot 300 and vibration sensor 200 for operating switch group 500. In addition, switch operation device 100 is configured to be able to communicate with external server 400 via network 600.

Switch operation device 100 controls the operation of robot 300 in accordance with a user operation, preset operation information, or the like to operate switch group 500. Switch operation device 100 includes interface (IF) unit 101, user interface (UI) unit 102, controller 103, memory 104, communication unit 105, and hard disk drive (HDD) 106. Each part in switch operation device 100 is communicably connected by an internal bus or the like. IF unit 101 is an interface for communicably connecting to vibration sensor 200 and robot 300. In addition, IF unit 101 transmits a control signal for controlling robot 300 to robot 300 and receives a signal from robot 300 side. IF unit 101 includes, for example, an electronic circuit.

UI unit 102 receives an operation from the user and displays an operation result with respect to switch group 500. UI unit 102 may include, for example, a mouse and a keyboard or may be configured by a touch panel display or the like in which a display unit and an operation part are integrated. Controller 103 reads various programs and data stored in memory 104 or HDD 106 and executes processing, thereby implementing various functions according to the present exemplary embodiment. Controller 103 includes at least one of a central processing unit (CPU), a micro processing unit (MPU), a digital signal processor (DSP), or a field programmable gate array (FPGA). Note that controller 103 as a determination unit to be described later and controller 103 as a controller that controls the operation of robot 300 may include the same components or may include different components. Memory 104 is a storage area for storing therein and retaining data corresponding to various types of information, and includes, for example, a read-only memory (ROM) that is a nonvolatile storage area and a random access memory (RAM) that is a volatile storage area.

Communication unit 105 is a network interface for communicating with an external device (In the present example, external server 400 and the like) via network 600. The communication method by communication unit 105 is not particularly limited and may be wired or wireless. HDD 106 is a nonvolatile storage area and is an example of a recording unit. Network 600 includes one or a plurality of networks and may include, for example, a wireless local area network (LAN), the Internet, or the like.

Vibration sensor 200 is a sensor that detects vibration generated when robot 300 operates switch group 500 and acquires the vibration as vibration information. A configuration example of vibration sensor 200 will be described later with reference to the drawings. Robot 300 is a robot disposed at a position where switch group 500 can be operated. Robot 300 is configured to be able to adjust the position coordinates of an operation portion (for example, the distal end portion of robot 300) with respect to the switch by a plurality of drive shafts (for example, four axes or six axes), for example. A configuration example of robot 300 will be described later with reference to the drawings.

External server 400 is a server for holding and managing history information and operation instruction information related to a switch operation to be described later. External server 400 provides or records various types of information in response to a request from switch operation device 100 or the like. External server 400 may be an on-premises type or a cloud type server device. Note that, in the present exemplary embodiment, an example is illustrated in which switch operation device 100 and external server 400 are configured as separate devices, but the present disclosure is not limited thereto and may have an integrated configuration.

Switch group 500 includes one or a plurality of switches operated by robot 300. There are various structures and shapes of switches. In the present exemplary embodiment, a toggle switch, a push switch, and a rocker switch will be described as examples of the switch.

[Hand Member]

Figure 2:
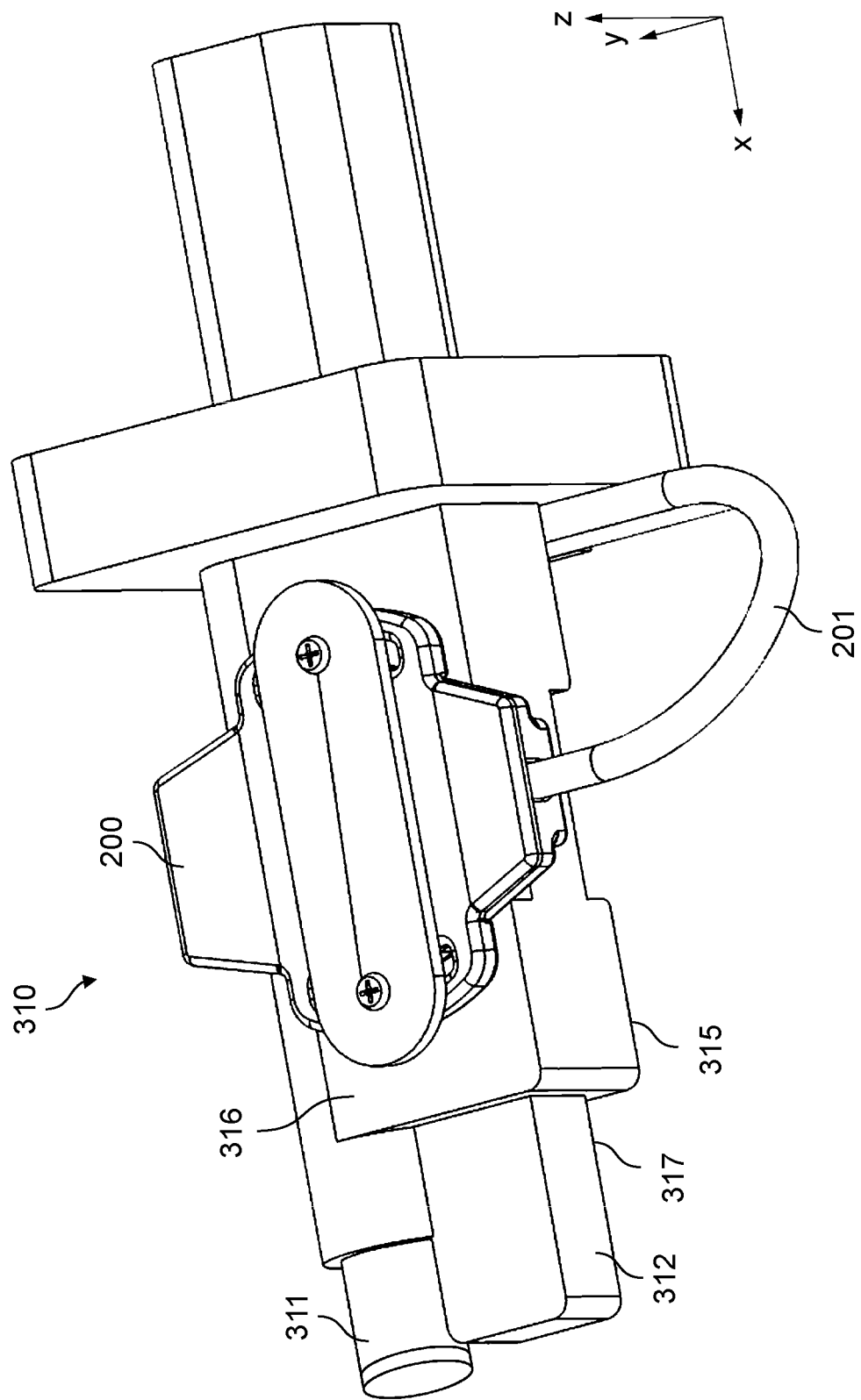
FIG. 2 is an external perspective view illustrating a configuration example of a hand member included in a robot according to the first exemplary embodiment.

FIG. 2 is an external perspective view of an example of hand member 310 (hand portion) provided in robot 300 according to the present exemplary embodiment. Hand member 310 is provided at the distal end portion of robot 300 and operates each switch by coming into contact with switch group 500. Note that directions in xyz coordinate systems indicated in the respective drawings that are used in the following descriptions correspond to one another. The x axis, the y axis, and the z axis in the xyz coordinate system are orthogonal to one another. Note that the xyz coordinate system illustrated in FIG. 2 does not necessarily coincide with a three-dimensional coordinate system (robot coordinate system) used at the time of controlling robot 300.

Hand member 310 includes touch detector 311 and switch operation part 312 as a configuration on a side in contact with switch group 500. Touch detector 311 detects touch with an object located in the x-axis direction and includes, for example, a tactile sensor (not illustrated). Note that touch detector 311 may be integrated with switch operation part 312. Information detected by touch detector 311 is notified to switch operation device 100. Note that another sensor may be further used to acquire information necessary for controlling robot 300. For example, a known gyro sensor, a slip sensor, a proximity sensor, a torque sensor, or the like may be used. Switch operation part 312 is a part for operating individual switches constituting switch group 500 and has contact surface 317 that comes into contact with an object. A specific example of the operation of the switch will be described later with reference to FIGS. 3 to 5.

Hand member 310 is connected to the arm portion of robot 300 by connection unit 313. Hand member 310 has first surface 315 on the same side as contact surface 317 when viewed from the distal end of hand member 310 and second surface 316 opposite to first surface 315. Vibration sensor 200 is installed on second surface 316 of hand member 310, and vibration information detected by vibration sensor 200 is notified to switch operation device 100 via connection cable 201. The installation position of vibration sensor 200 is not particularly limited, but vibration sensor 200 is desirably installed around switch operation part 312 in order to more accurately detect vibration generated when switch operation part 312 comes into contact with the switch. That is, vibration sensor 200 may be disposed on first surface 315.

Hand member 310 may be configured to be rotatable about the x axis by the operation of robot 300. In the example of FIG. 2, vibration sensor 200 is located on the upper side in the z-axis direction of hand member 310, but vibration sensor 200 can be turned sideways by rotating hand member 310. Therefore, hand member 310 may be appropriately rotated according to the relative position with respect to the switch in order to detect the vibration at the time of operating the switch with higher accuracy. At this time, by attaching a gyro sensor to hand member 310, the position of vibration sensor 200, that is, the direction and arrangement with respect to the contact surface with the switch may be determined from the orientation of hand member 310.

[Switch Operation Example]

[(Toggle Switch)]

Figure 3:
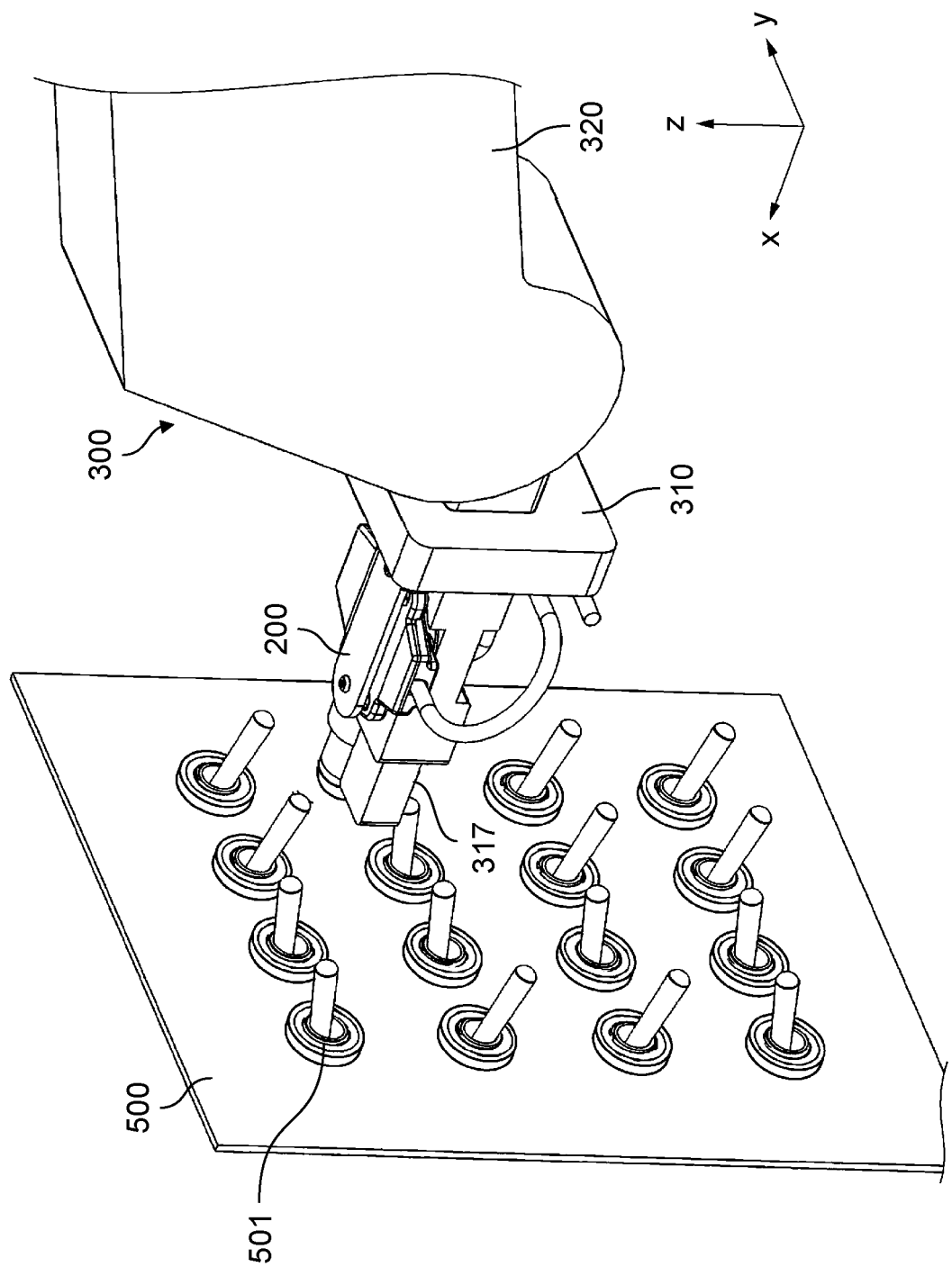
FIG. 3 is an external perspective view for explaining an operation example of a toggle switch according to the first exemplary embodiment.

FIG. 3 is a schematic view for explaining an operation example of the toggle switch by hand member 310 of robot 300 according to the present exemplary embodiment. Referring to FIG. 3, switch group 500 shows a state in which a plurality of toggle switches 501 (In this example, a total of 4×4=16 pieces are used) are provided on a wall surface. Toggle switch 501 is configured to be vertically switchable. The shape and the like of switch operation part 312 of hand member 310 are not limited to a rod shape, and may be configured to have a plate shape, a hemispherical shape, a hook shape, or the like according to the arrangement, dimensions, and the like of toggle switch 501.

Hand member 310 coupled to arm portion 320 is provided at the distal end portion of robot 300. Then, robot 300 moves or rotates in the up, down, left, and right directions on the basis of an instruction from switch operation device 100, thereby approaching, touching, and operating target toggle switch 501 in switch group 500. To raise toggle switch 501, robot 300 moves hand member 310 from the lower side to the upper side in the z-axis direction. On the other hand, to lower toggle switch 501, robot 300 moves hand member 310 from the upper side to the lower side in the z-axis direction. In the case of the example of FIG. 3, a state is illustrated in which certain toggle switch 501 is in contact from the upper side in the z-axis direction and is operated downward. At this time, when hand member 310 is viewed from the distal end side, vibration sensor 200 is desirably provided on a surface facing a surface in contact with toggle switch 501 via hand member 310 or a surface on the same side as a surface in contact with toggle switch 501. In FIG. 3, the surface on which vibration sensor 200 is located is an upper surface at a position facing contact surface 317 with toggle switch 501 or a lower surface same as contact surface 317 when hand member 310 is viewed along the x-axis direction from the wall surface side. Here, contact surface 317 of hand member 310 is a surface that comes into contact with toggle switch 501 when hand member 310 operates toggle switch 501 (object).

As a result, since vibration sensor 200 can be installed in accordance with the direction of vibration transmitted from the switch to hand member 310, it is possible to more accurately detect vibration generated when the hand member comes into contact with the switch. That is, by installing vibration sensor 200 in accordance with the direction of vibration along the switch switching direction (in the present example, the z-axis direction), the detection accuracy by vibration sensor 200 can be improved.

In addition, before hand member 310 operates the switch, a surface on which the switch and hand member 310 come into contact may be assumed on the basis of information about the operation to be performed next or information of a sensor or the like attached to the hand member.

When vibration sensor 200 is not located on the surface at the position facing the assumed contact surface or the surface on the same side as the assumed contact surface, hand member 310 may be rotated such that vibration sensor 200 is located on the surface at the position facing the contact surface or the surface on the same side as the contact surface. That is, controller 103 of switch operation device 100 may rotate hand member 310 by controlling robot 300 such that first surface 315 opposite to second surface 316 on which vibration sensor 200 is disposed is located on the same side as contact surface 317. Furthermore, controller 103 may rotate hand member 310 by controlling robot 300 so that second surface 316 on which vibration sensor 200 is disposed is positioned on the same side as contact surface 317.

As a result, even in a case where the operation direction of hand member 310 is different when a plurality of switches are operated, vibration sensor 200 can more accurately detect vibration generated when the hand member comes into contact with the switches.

(Push Switch)

Figure 4:
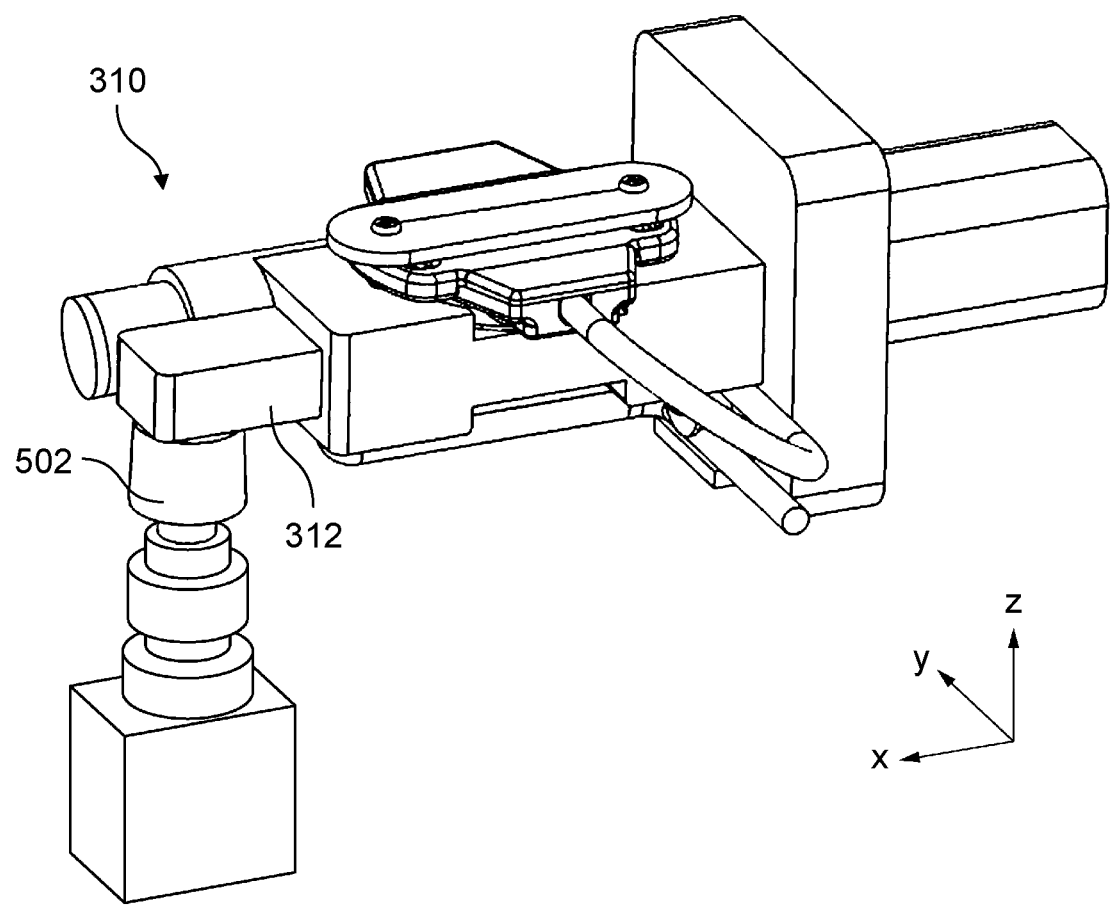
FIG. 4 is an external perspective view for explaining an operation example of a push switch according to the first exemplary embodiment.

FIG. 4 is a schematic view for explaining an operation example of the push switch by hand member 310 of robot 300 according to the present exemplary embodiment. Here, arm portion 320 of robot 300 is omitted. FIG. 4 illustrates push switch 502 as a part of switch group 500. Push switch 502 can be operated by being pressed along a predetermined direction (in the present example, the z-axis direction). The position of the upper surface (in this example, the contact surface with switch operation part 312) of push switch 502 may change depending on the on or off state or may not change depending on the on or off state. The shape and the like of switch operation part 312 of hand member 310 may be configured in accordance with the dimensions and the like of push switch 502.

Robot 300 moves or rotates in the up, down, left, and right directions on the basis of an instruction from switch operation device 100, thereby approaching, touching, and operating target push switch 502 in switch group 500. Robot 300 presses push switch 502 by a predetermined pressing amount along the z-axis direction to operate push switch 502.

(Rocker Switch)

Figure 5:
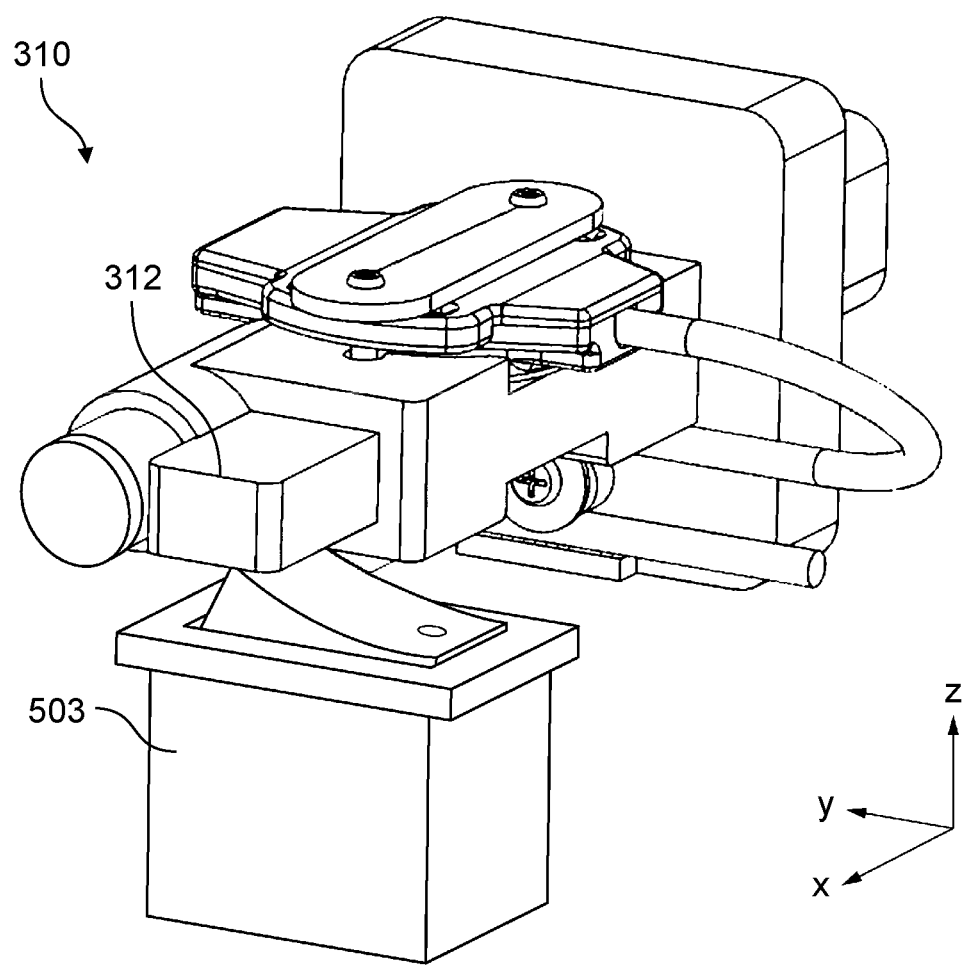
FIG. 5 is an external perspective view for explaining an operation example of a rocker switch according to the first exemplary embodiment.

FIG. 5 is a schematic view for explaining an operation example of the rocker switch by hand member 310 of robot 300 according to the present exemplary embodiment. Here, arm portion 320 of robot 300 is omitted. FIG. 5 illustrates rocker switch 503 as a part of switch group 500. Rocker switch 503 can be operated by being pressed along a predetermined direction (in the present example, the z-axis direction). The position of the upper surface (in this example, the contact surface with switch operation part 312) of rocker switch 503 changes according to the on or off state. The shape and the like of switch operation part 312 of hand member 310 may be configured in accordance with the dimensions and the like of rocker switch 503.

Robot 300 moves or rotates in the up, down, left, and right directions on the basis of an instruction from switch operation device 100, thereby approaching, touching, and operating target rocker switch 503 in switch group 500. Robot 300 presses rocker switch 503 by a predetermined pressing amount along the z-axis direction to operate rocker switch 503.

Note that the robot 300 may be configured to be installed around switch group 500 (for example, a wall surface of the switch group illustrated in FIG. 3 or a table on which the switch is installed). Furthermore, robot 300 may be configured to be movable only in some directions related to the operation of the switch among the three axis directions.

[Vibration Waveform]

Figure 6:
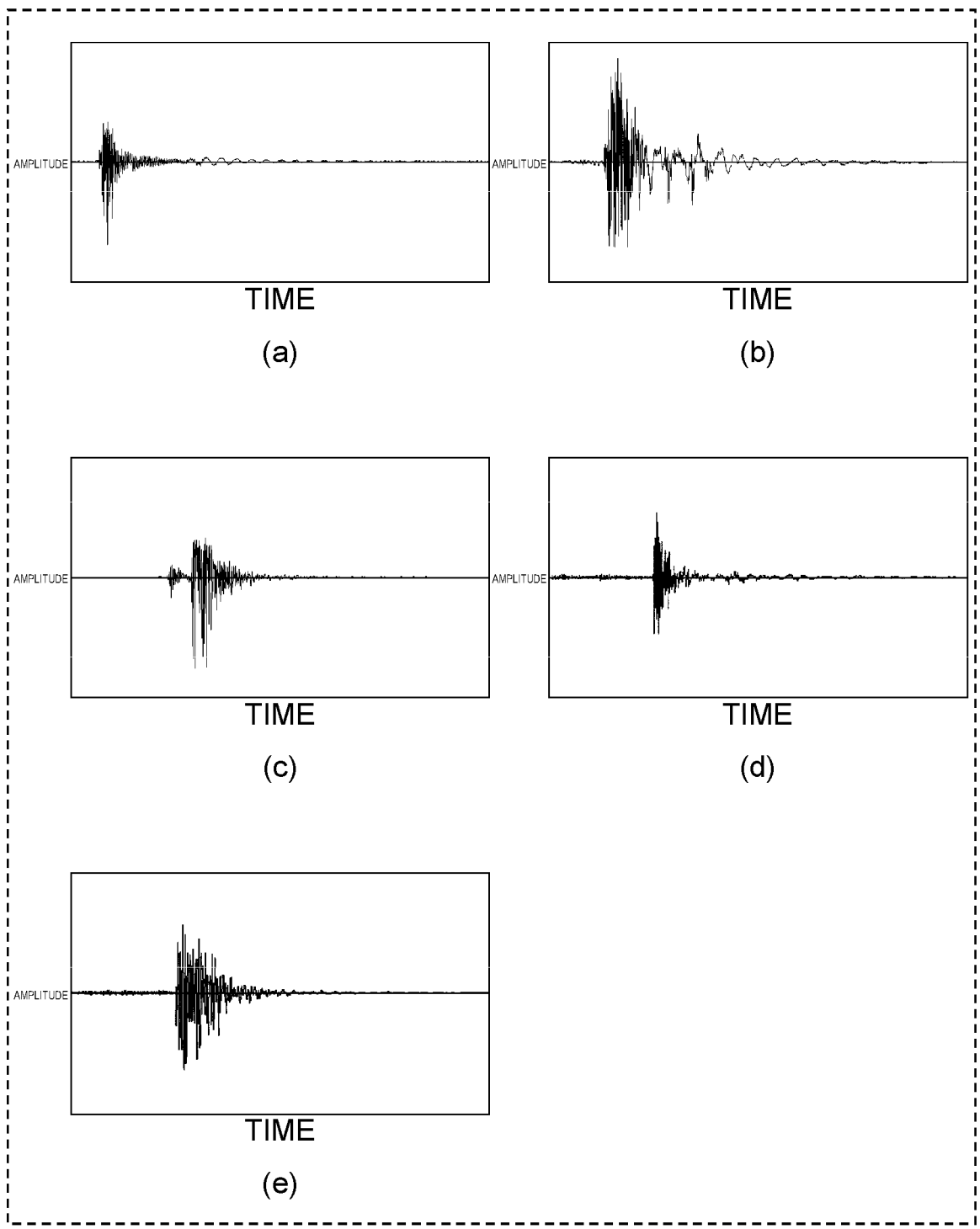
FIG. 6 is a graph illustrating an example of a vibration waveform generated when the switch according to the first exemplary embodiment is operated.

The vibration waveform of the vibration information acquired by vibration sensor 200 by operating switch group 500 will be described. FIG. 6 illustrates an example of the vibration waveform acquired by vibration sensor 200, in which the vertical axis represents amplitude and the horizontal axis represents time.

FIG. 6A illustrates an example of a vibration waveform generated when push switch 502 is operated and switching is normally performed. FIG. 6B illustrates an example of a vibration waveform generated when rocker switch 503 is operated and switching is normally performed. FIG. 6C illustrates an example of a vibration waveform generated when toggle switch 501 is operated and switching is normally performed. FIG. 6D illustrates an example of a vibration waveform generated when toggle switch 501 is operated and the switching cannot be normally performed due to insufficient force. FIG. 6E illustrates an example of a vibration waveform generated when contact is made in order to operate toggle switch 501 already operated. These vibration waveforms are influenced by the shape and internal structure of the switch. Note that the internal structure includes elastic energy and may be, for example, a spring or a piston structure such as a coil spring or a leaf spring.

Therefore, as illustrated in FIG. 6, the generated vibration waveform differs depending on the type of switch to be operated, the operation result, and the like. In the present exemplary embodiment, focusing on this difference, the switch operation is controlled and determined.

[Learning Processing]

In the present exemplary embodiment, the operation result of the switch is determined using a learned model generated using a predetermined learning algorithm with vibration information as learning data. As described with reference to FIG. 6, in the present exemplary embodiment, vibration information of different vibration waveforms is handled according to the switch operation. It is assumed that a learning processing is performed before a processing procedure according to the present exemplary embodiment to be described later, and a learned model is generated.

Figure 7:
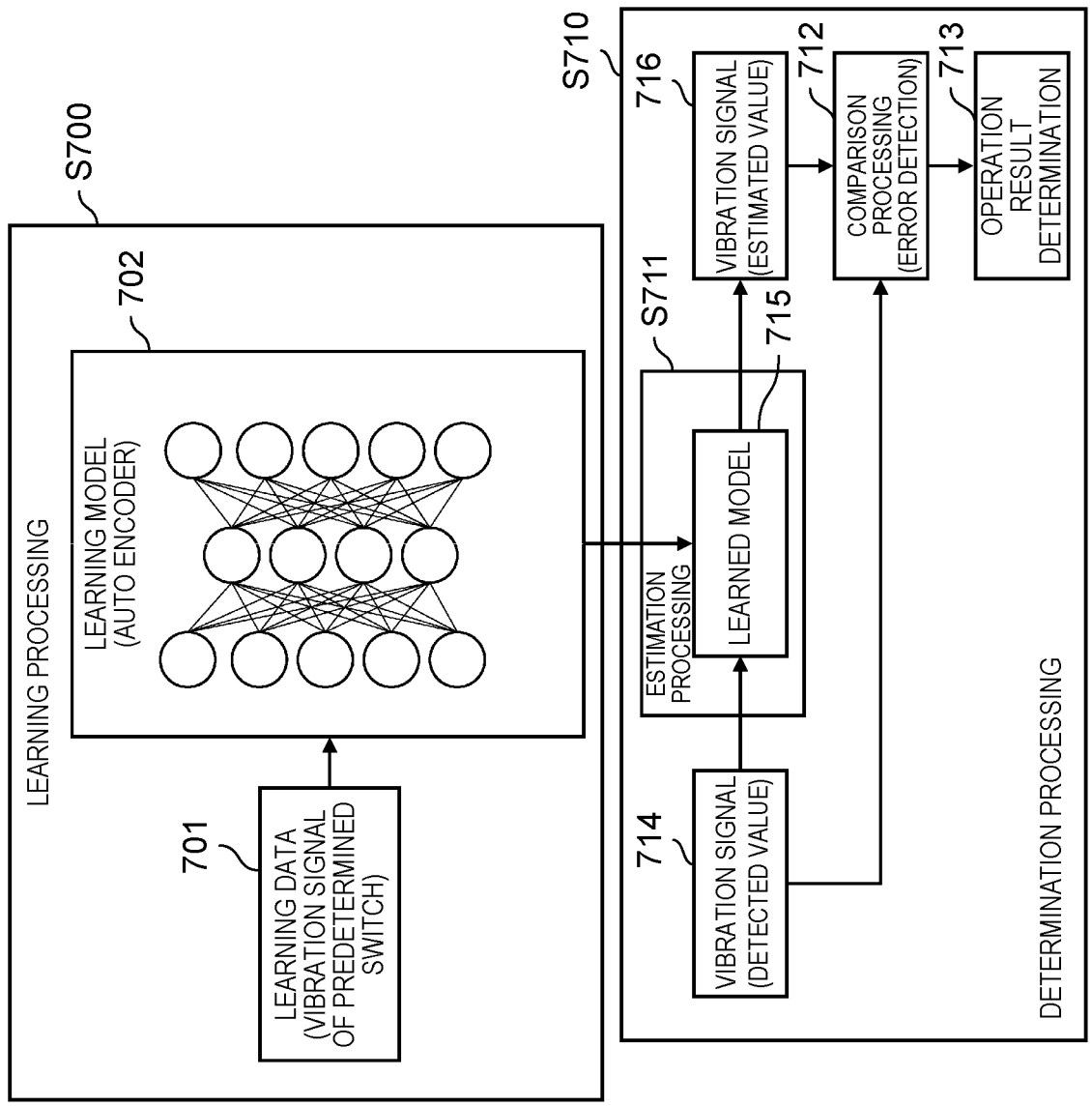
FIG. 7 is a schematic diagram for explaining learning processing and determination processing according to the first exemplary embodiment.

Learning processing for generating a learned model used in switch operation device 100 according to the present exemplary embodiment will be described. FIG. 7 is a conceptual diagram illustrating a procedure for generating a learned model according to the present exemplary embodiment. Here, the process is divided into a learning process (step S700: learning phase) for generating a learned model using learning data and a determination process (step S710: determination phase) using the generated learned model. Note that the determination phase is included in a part of processing of switch operation device 100 to be described later.

In the description of the present exemplary embodiment, "learning" or "machine learning" refers to generating a "learned model" by performing learning using learning data and an arbitrary learning algorithm. The learned model is updated in a timely manner as learning proceeds using a plurality of learning data, and an output thereof changes even if the input is the same. Therefore, the learned model does not limit at which time point the state is. Here, a model used in learning is described as a "learning model", and a learning model subjected to learning to a certain extent is described as a "learned model". Furthermore, although a specific example of the "learning data" will be described later, the configuration thereof may be changed according to a learning algorithm to be used. In addition, the learning data may include teacher data used for learning itself, verification data used for verification of the learned model, and test data used for testing the learned model. In the following description, when data related to learning is comprehensively indicated, it is described as "learning data", and when data at the time of performing learning itself is indicated, it is described as "teacher data". Note that it is not intended to clearly classify the teacher data, the verification data, and the test data included in the learning data, and for example, depending on methods of learning, verification, and testing, all the learning data can also be teacher data.

The processing of the learning phase is implemented by the processor of the information processing device (not illustrated) reading and executing various programs stored in the storage unit. Examples of the information processing device include a personal computer (PC). Furthermore, the processor may include a CPU, a graphical processing unit (GPU), or the like. The storage unit may include a ROM, a RAM, and an HDD.

In the learning phase, the learning processing, the verification operation, and the like are repeatedly performed using learning model 702 based on a predetermined learning algorithm using learning data 701 including a plurality of pieces of vibration information, so that learned model 715 having a certain accuracy is generated. In the present exemplary embodiment, an auto encoder based on a neural network is used as a learning algorithm. The auto encoder may be implemented using a known method, and a detailed description thereof will be omitted here. Furthermore, in the present exemplary embodiment, a vibration signal in a predetermined switch is used as learning data 701. Here, a vibration signal (corresponding to FIG. 6C) when toggle switch 501 is operated and switching is normally performed is used.

The vibration signal generated by the operation of toggle switch 501 is subjected to learning processing by the auto encoder as learning data 701, thereby generating learned model 715 that outputs the input vibration signal as a vibration signal (estimated value) close to a vibration waveform generated when the operation of toggle switch 501 is successful. Note that the learned model used in switch operation device 100 does not limit at which time point the learned model is used. Therefore, learning processing may be appropriately performed, and the learned model held by switch operation device 100 may be updated by the learned model updated accordingly.

Furthermore, in the present exemplary embodiment, an example of using a method of an auto encoder in machine learning as a learning method is illustrated, but a more specific algorithm of the auto encoder is not particularly limited. A known method such as a convolutional neural network (CNN) may be used using a deep learning method using a neural network, or another algorithm may be used.

The determination process (step S710) is a process executed during the switch operation of switch operation device 100. First, as described above, vibration signal 714 (detection value) is acquired by vibration sensor 200 at the time of switch operation. By using vibration signal 714 as an input and applying learned model 715 generated by the learning process (step S700), vibration signal 716 (estimated value) close to the vibration waveform of toggle switch 501 is output.

Then, the error is detected by comparison processing between vibration signal 714 and vibration signal 716 (step S712). The detection of the error here may be performed using, for example, a known mean square error or the like.

Furthermore, an operation result for the switch is determined on the basis of the error obtained in step S712 (step S713). In step S713, for example, a threshold value for the error is set in advance, and the operation result is determined by the comparison.

Note that, in the above example, the case of determining the type of operation target and the success or failure of the operation has been described as an example, but the present disclosure is not limited thereto. As long as the feature of the generated vibration signal can be specified, it may be configured such that a failure, a malfunction, or the like of the switch can be detected.

[Processing Procedure]

Figure 8:
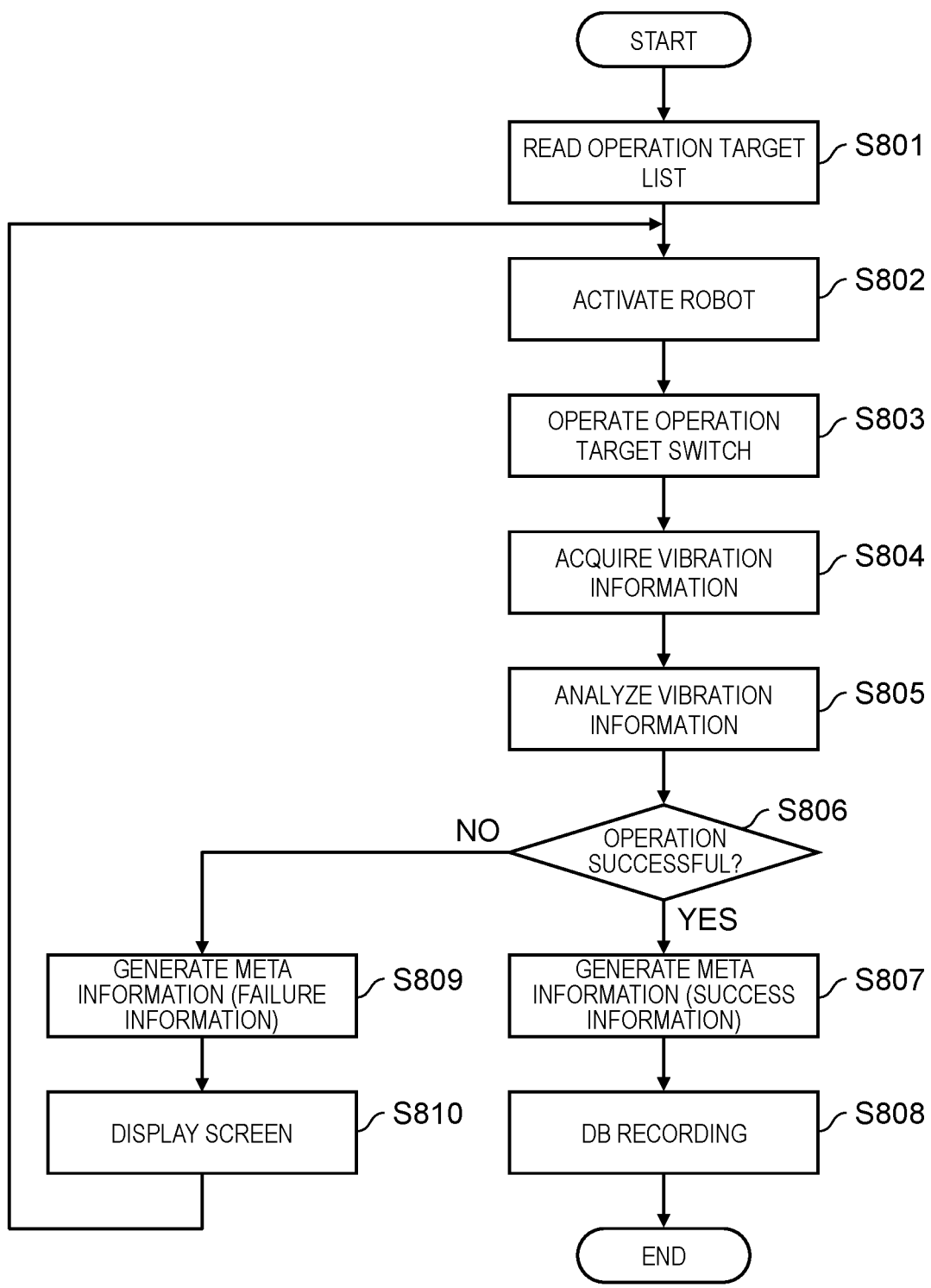
FIG. 8 is a flowchart of processing according to the first exemplary embodiment.

FIG. 8 is a flowchart illustrating processing at the time of the switch operation of switch operation device 100 according to the present exemplary embodiment. This processing procedure may be implemented by controller 103 of switch operation device 100 reading and executing a program stored in a storage unit such as HDD 106. In addition, it is assumed that a learned model is generated by learning processing before the present processing procedure is started and is available in switch operation device 100.

Switch operation device 100 reads the operation target list in which information about the operation of switch group 500 is defined (step S801). In the operation target list, the arrangement and position coordinates of switches to be operated, information about operation (information indicating whether to turn on or off), the number of operations, and the like may be designated. The operation target list may be read from DB 401 included in external server 400 or may be read from HDD 106 in switch operation device 100. Alternatively, the operation target list designated by the user via UI unit 102 may be read.

Switch operation device 100 controls robot 300 on the basis of the operation target list read in step S801 and adjusts the position of hand member 310 around the switch to be operated (step S802). The control amount here may be defined in advance according to the information about operation of the target switch.

Switch operation device 100 operates a switch to be operated by robot 300 on the basis of the operation target list read in step S801 (step S803).

IF unit 101 (an example of an acquisition unit) of switch operation device 100 acquires vibration information generated by the operation performed in step S803 via vibration sensor 200 (step S804).

The switch operation device 100 analyzes the vibration information using the vibration information acquired in step S804 and learned model 715 (step S805). In the analysis here, the details of the determination processing (step S710) described with reference to FIG. 7 are performed.

Controller 103 (an example of a determination unit) of switch operation device 100 determines whether or not the switch operation is successful on the basis of the analysis result of step S805. When the switch operation is successful (step S806; YES), the process of switch operation device 100 proceeds to step S807. On the other hand, when the switch operation is not successful (step S806; NO), the process of switch operation device 100 proceeds to step S809.

Switch operation device 100 generates meta information for management related to an operation result (success) (step S807). The meta information here may include information on the operation target switch, an operation date and time, an operation result (success), information on the robot that has performed the operation, and the like.

Switch operation device 100 records the meta information generated so far in the database (step S808). Here, the recording destination may be the HDD 106 in switch operation device 100 or DB 401 provided in external server 400. At this time, switch operation device 100 may store the meta-information generated in step S807 and the operation target list read in step S801 in association with each other. Then, the processing procedure ends.

Switch operation device 100 generates meta information for management related to an operation result (failure) (step S809). The meta information here may include information on the operation target switch, an operation date and time, an operation result (failure), cause of failure, information on the robot that has performed the operation, and the like.

Switch operation device 100 displays the fact that the operation on the switch has failed on UI unit 102 (step S810). The display method here is not particularly limited, but for example, the corresponding information may be displayed on a screen, or a lamp or the like may be blinked. Then, the process of switch operation device 100 returns to step S802 to repeat the process.

Note that, in a case where an operation on a plurality of switches or a plurality of operations on one switch are designated in the operation target list, each process illustrated in FIG. 8 may be repeatedly executed according to each operation. In addition, in the example of FIG. 8, when the operation on the switch has failed, the operation of robot 300 is repeated, and thereafter, when the operation on the switch has succeeded, recording is performed in the DB. However, the present invention is not limited to this procedure, and recording may be performed in the DB every time an operation on the switch fails.

As described above, switch operation device 100 includes vibration sensor 200 that acquires the vibration signal generated when the position of switch group 500 is switched and controller 103 that determines the state of switch group 500 using the vibration signal. As a result, it is possible to determine the operation result for the switch on the basis of the vibration signal at the time of operating the switch.

Switch group 500 includes a spring, and the vibration signal includes vibration generated by the spring at the time of position switching. As a result, it is possible to appropriately detect vibration caused by the spring at the time of position switching and to accurately perform state determination.

A state of the position of a switch is determined for the switch. This makes it possible to appropriately determine the state including the position of the switch.

Furthermore, controller 103 determines the state of switch group 500 by comparing the input vibration signal with the vibration signal output from learned model 715, and learned model 715 learns the vibration signal of a predetermined switch and outputs a signal indicating vibration generated at the time of the position switching of the predetermined switch as an output signal. This makes it possible to determine the operation result for the switch using the learned model generated by machine learning.

In addition, controller 103 can determine the type of switch whose position has been switched or the state of the operated switch (for example, operation success, operation failure, and operation completion) as the operation result of switch group 500. The state of the switch may be an on or off position of the switch, a failure or a malfunction of the switch, or the like. Note that the position of the switch may be a position in the middle of switching, such as the position of the upper surface when the push switch or the rotary switch is pushed. Therefore, the state, the position, and the like may be defined according to the configuration of the switch.

Switch group 500 includes any one of a toggle switch, a push switch, and a rocker switch. This enables operation determination for various types of switches.

Switch operation device 100 further includes HDD 106 that records an operation result. As a result, the operation information of the switch can be recorded as a history.

In addition, robot 300 includes hand member 310 having a contact surface that comes into contact with the switch when the switch is operated, and vibration sensor 200 is disposed on a surface on the same side as the contact surface or a surface on a side facing the contact surface via the hand member when viewed from the distal end side of hand member 310. This makes it possible to accurately acquire vibration information.

In addition, robot 300 includes hand member 310 having a contact surface that comes into contact with the switch when the switch is operated, and controller 103 performs control such that vibration sensor 200 installed in robot 300 is positioned on a surface on the same side as the contact surface or a surface on a side facing the contact surface via hand member 310 when viewed from the distal end side of hand member 310 according to the information about operation of the switch by robot 300. As a result, vibration sensor 200 can be adjusted to a direction or a position in which vibration information can be acquired more accurately.

Second Exemplary Embodiment

The second exemplary embodiment of the present invention will be described. In the present exemplary embodiment, a configuration in which switch operation device 100 and remote operation device 900 operated by a user are disposed at different positions on the assumption of remote operation of a switch will be described. In addition, in the first exemplary embodiment, the configuration in which the determination processing is performed using the learned model generated by the learning processing has been described. In the present exemplary embodiment, a configuration for performing rule-based determination processing will be described. Note that description of details overlapping with the first embodiment will be omitted, and description will be given focusing on the difference.

[System Configuration]

Figure 9:
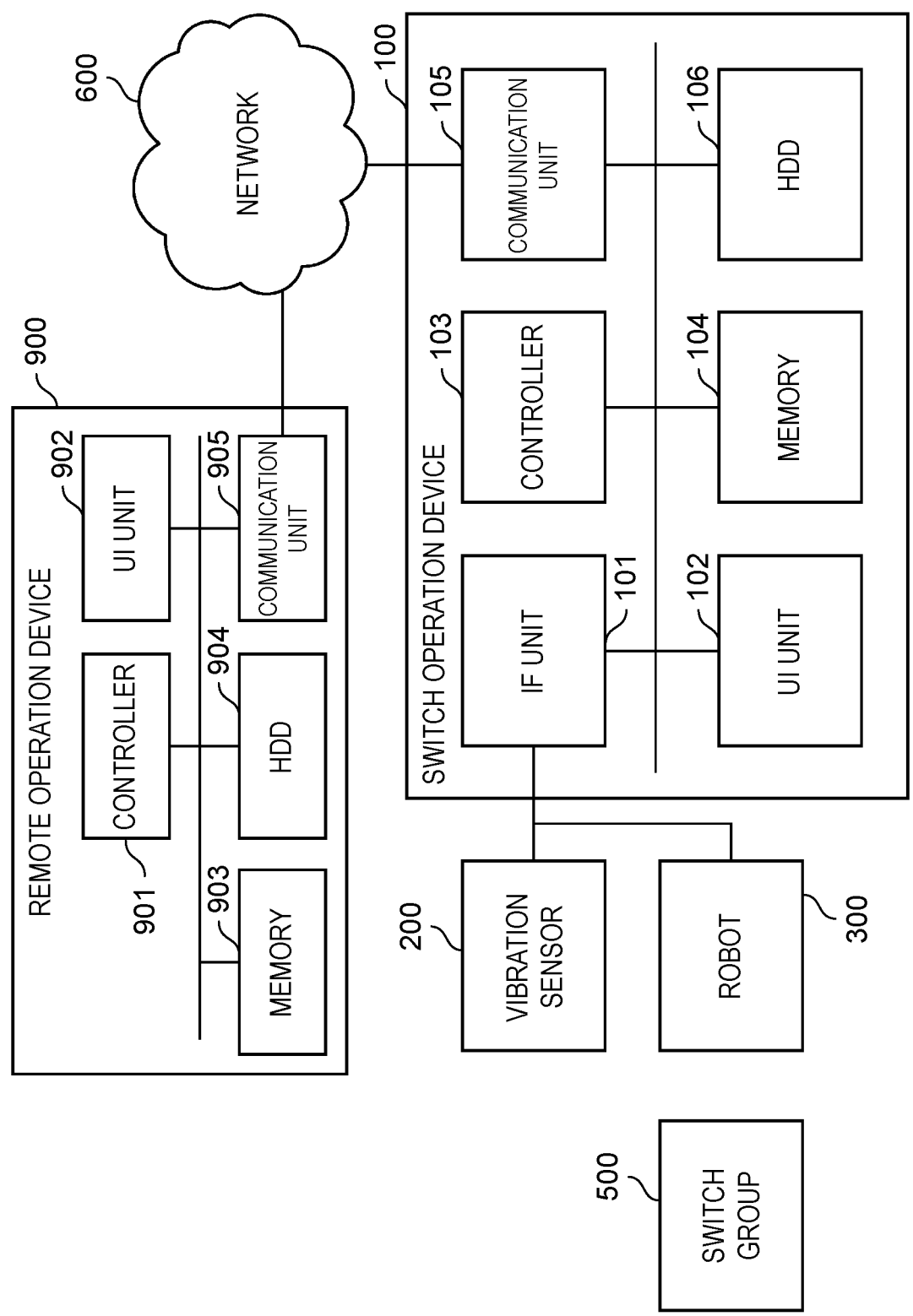
FIG. 9 is a block diagram illustrating an example of a system configuration according to the second exemplary embodiment.

FIG. 9 is a block diagram illustrating an example of an overall configuration of a system including switch operation device 100 and remote operation device 900 according to the present exemplary embodiment. Switch operation device 100 and remote operation device 900 are communicably connected via network 600. The configuration of switch operation device 100 is similar to the configuration described in the first exemplary embodiment.

Remote operation device 900 is an information processing device for instructing switch operation device 100 located at a remote location to perform a switch operation and includes, for example, a PC or a mobile terminal. Remote operation device 900 includes controller 901, UI unit 902, memory 903, HDD 904, and communication unit 905. Each part in remote operation device 900 is communicably connected by an internal bus or the like.

Controller 901 reads various programs and data stored in memory 903 or HDD 904 and executes processing, thereby implementing various functions according to the present exemplary embodiment. Controller 901 may be configured using at least one of a CPU, an MPU, a DSP, and an FPGA. UI unit 902 receives an operation from the user and displays an operation result with respect to switch group 500. UI unit 902 may include, for example, a mouse and a keyboard or may be configured by a touch panel display or the like in which a display unit and an operation unit are integrated.

Memory 903 is a storage area for storing and holding data of various types of information and may include, for example, a ROM which is a nonvolatile storage area and a RAM which is a volatile storage area. HDD 904 is a nonvolatile storage area. Communication unit 905 is a network interface for communicating with an external device (in the present example, switch operation device 100 and the like) via network 600. The communication method by communication unit 905 is not particularly limited and may be wired or wireless.

In the present exemplary embodiment, when remote operation device 900 operates switch operation device 100, an application program held in HDD 904 or the like may be used, or a web application provided by accessing switch operation device 100 via a web browser (not illustrated) may be used.

[Processing Sequence]

Figure 10:
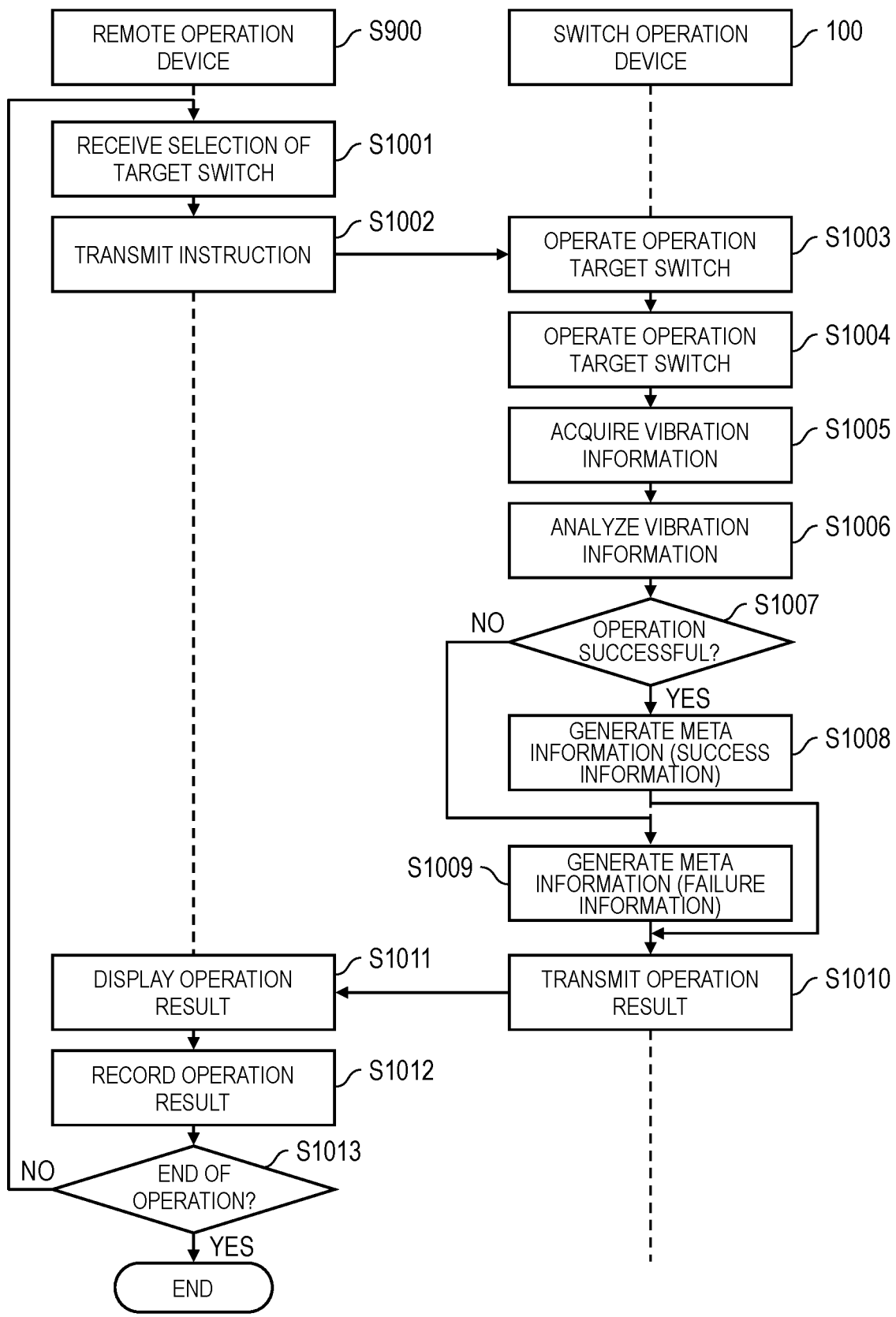
FIG. 10 is a sequence diagram of processing according to the second exemplary embodiment.

FIG. 10 illustrates a process sequence related to the switch operation process according to the present exemplary embodiment. The present processing sequence may be implemented by the controller of switch operation device 100 and remote operation device 900, which are processing subjects of each processing step, reading and executing the program stored in the storage unit.

Remote operation device 900 receives selection of a switch to be operated from the user via UI unit 902 (step S1001). At this time, remote operation device 900 may also receive the information about operation of the switch to be operated. The information received here may be displayed so as to be selectable by the user on an operation screen (not illustrated) for remote operation. Alternatively, the user may designate the operation target list as described in the first exemplary embodiment.

Remote operation device 900 transmits the instruction received in step S1001 to switch operation device 100 (step S1002).

Switch operation device 100 controls robot 300 on the basis of the instruction transmitted from remote operation device 900 to adjust the position of hand member 310 around the switch to be operated (step S1003). The control amount here may be defined in advance according to the information about operation of the target switch.

Switch operation device 100 operates a switch to be operated by robot 300 on the basis of the instruction transmitted from remote operation device 900 (step S1004).

Switch operation device 100 acquires vibration information generated by the operation performed in step S1004 via vibration sensor 200 (step S1005).

Switch operation device 100 analyzes the vibration information on the basis of the vibration information acquired in step S1005 and the predefined rule for the vibration information (step S1006). The rule according to the present exemplary embodiment may be defined based on, for example, the peak value of the vibration waveform, the number of peaks per certain time, the generation interval of the waveform, and the like. In addition, a plurality of conditions may be defined in the rule in order to determine the type of switch and the operation result.

Switch operation device 100 determines whether the switch operation is successful based on the analysis result in step S1007. When the switch operation is successful (step S1007; YES), the process of switch operation device 100 proceeds to step S1008. On the other hand, when the switch operation is not successful (step S1007; NO), the process of switch operation device 100 proceeds to step S1009.

Switch operation device 100 generates meta information for management related to an operation result (success) (step S1008). The meta information here may include information on the operation target switch, an operation date and time, an operation result (success), information on the robot that has performed the operation, and the like. Thereafter, the process of switch operation device 100 proceeds to step S1010.

Switch operation device 100 generates meta information for management related to an operation result (failure) (step S1009). The meta information here may include information on the operation target switch, an operation date and time, an operation result (failure), cause of failure, information on the robot that has performed the operation, and the like. Thereafter, the process of switch operation device 100 proceeds to step S1010.

Switch operation device 100 transmits the operation result of the switch to remote operation device 900 (step S1010). At this time, switch operation device 100 transmits the operation result including the meta information generated in step S1008 or step S1009.

Remote operation device 900 displays the operation result on UI unit 902 on the basis of the operation result transmitted from switch operation device 100 (step S1011). The display method here is not particularly limited, but for example, the corresponding information may be displayed on a screen, or a lamp or the like may be blinked.

Remote operation device 900 records the operation result transmitted from switch operation device 100 in HDD 904 (step S1012).

Remote operation device 900 determines whether or not the operation on the switch has ended (step S1013). For example, in a case where an operation instruction is further received from the user, it may be determined that the operation on the switch is not ended. When an instruction to end the remote operation is received from the user, it may be determined that the operation on the switch is ended. When the operation is ended (step S1013; YES), this processing sequence ends. On the other hand, in a case where the operation has not ended (step S1013; NO), the process of remote operation device 900 returns to step S1001 to repeat the process.

In the present exemplary embodiment, the analysis processing in step S1006 is performed on a rule basis, but a learned model may be used as in the first exemplary embodiment. In addition, in the configuration of the first exemplary embodiment, analysis processing may be performed on a rule basis.

As described above, according to the present exemplary embodiment, switch operation device 100 determines the operation result of switch group 500 based on the vibration signal and the predefined rule. This makes it possible to determine an operation result for the switch on the basis of the vibration signal and the predefined rule.

In addition, switch operation device 100 is connected to remote operation device 900 via network 600, and controller 103 controls the operation of robot 300 on switch group 500 on the basis of an instruction input via remote operation device 900. This makes it possible to perform a switch operation on the basis of an instruction from a remote place.

When it is determined that the operation on switch group 500 has failed, controller 103 controls robot 300 to perform the operation on switch group 500 again. As a result, even when the operation on switch group 500 fails, it is possible to save the user trouble by automatically performing retry.

When it is determined that the operation on switch group 500 has failed, controller 103 again accepts the instruction of the operation on switch group 500. As a result, in a case where the operation on switch group 500 fails, it is possible to reliably operate the switch by receiving an instruction from the user.

Third Exemplary Embodiment

The third exemplary embodiment of the present invention will be described. In the present exemplary embodiment, a configuration for improving the accuracy of control of robot 300 by performing feedback related to the operation of robot 300 on the basis of the operation result with respect to the switch will be described. Note that description of details overlapping with the first embodiment will be omitted, and description will be given focusing on the difference. The system configuration is similar to that in FIG. 1 of the first exemplary embodiment.

[Processing Procedure]

Figure 11:
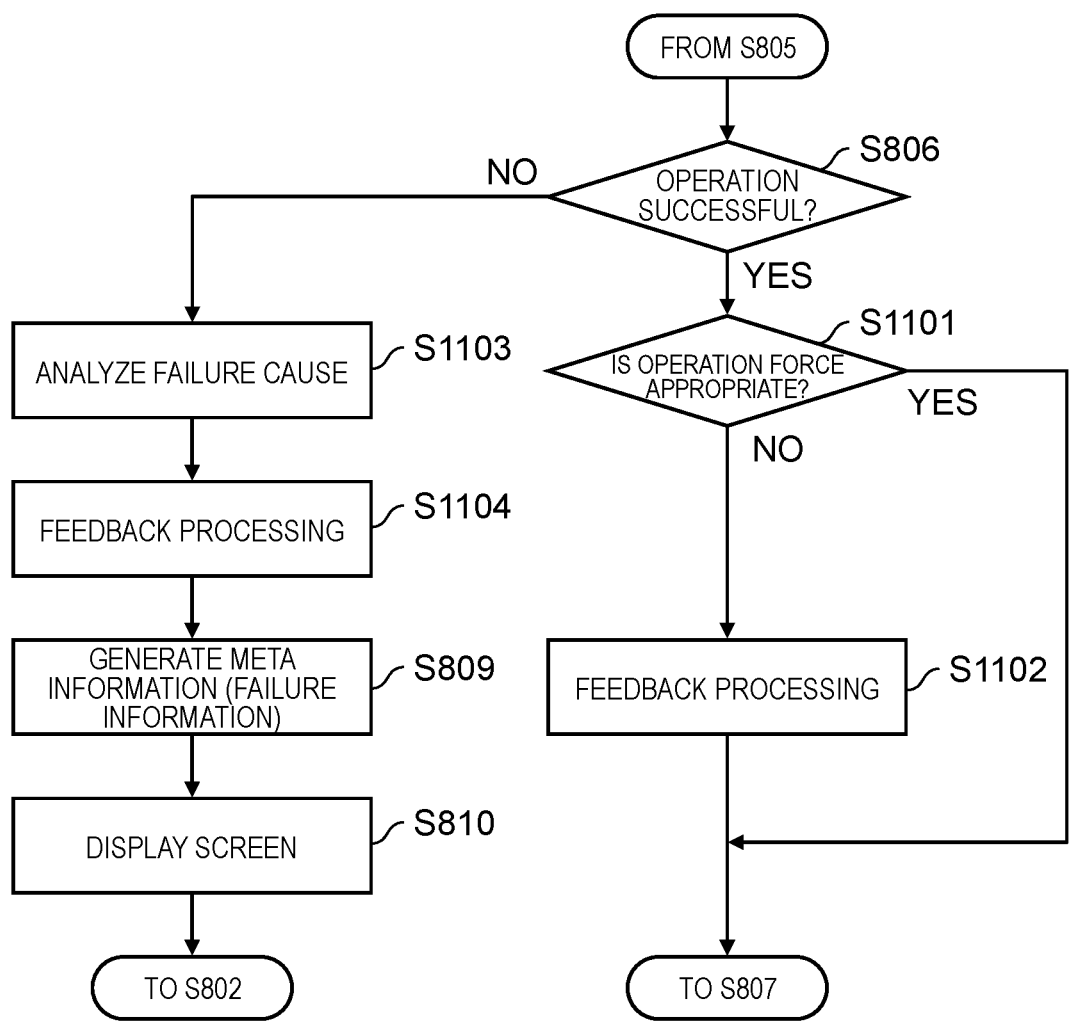
FIG. 11 is a flowchart of processing according to the third exemplary embodiment.

FIG. 11 shows part of a flowchart illustrating processing at the time of the switch operation of switch operation device 100 according to the present exemplary embodiment. Part of the processing procedure described with reference to FIG. 8 in the first exemplary embodiment corresponds to the configuration of FIG. 11. This processing procedure may be implemented by controller 103 of switch operation device 100 reading and executing a program stored in a storage unit such as HDD 106. In addition, it is assumed that a learned model is generated by learning processing before the present processing procedure is started and is available in switch operation device 100.

Switch operation device 100 determines whether the switch operation is successful based on the analysis result in step S805. When the switch operation is successful (step S806; YES), the process of switch operation device 100 proceeds to step S1101. On the other hand, when the switch operation is not successful (step S1101; NO), the process of switch operation device 100 proceeds to step S1103.

Switch operation device 100 determines whether the operation force (pressing amount) is appropriate when the switch is operated based on the analysis result in step S805 (step S1101). The generated vibration waveform varies depending on the operation force on the switch. That is, it is possible to determine whether or not the operation force is appropriate by analyzing the vibration waveform generated when the operation of the switch is successful. More specifically, it is determined that the operation force is either excessive, appropriate, or insufficient, and feedback is performed when the operation force is excessive or insufficient. The classification herein may be performed using, for example, the classification based on the learned model described in the first exemplary embodiment. In a case where the operation force is appropriate (step S101; YES), the process of switch operation device 100 proceeds to step S807. In contrast to this, in a case where the operation force is not appropriate (step S1101; NO), the process of switch operation device 100 proceeds to step S1102.

Switch operation device 100 performs feedback based on the operation result by adjusting a control parameter related to the operation of robot 300 (step S1102). The adjustment here may be performed stepwise using a preset value or may be performed according to the shape of a vibration waveform. Thereafter, the process of switch operation device 100 proceeds to step S807.

Switch operation device 100 further analyzes the cause of the failure based on the analysis result in step S805 (step S1103). Examples of the cause of the failure include insufficient operation force, pressing of the switch, and contact failure of the switch to be operated. The classification herein may be performed using, for example, the classification based on the learned model described in the first exemplary embodiment.

Switch operation device 100 performs feedback based on an operation result of the switch. Note that adjustment information may vary depending on information about the failure cause analyzed in step S1103. In addition, manual adjustment may be required depending on a failure cause.

Accordingly, the details of the feedback may be switched according to the analysis result in step S1103. Thereafter, the process of switch operation device 100 proceeds to step S809.

Examples of feedback according to the cause of a failure in operation on a switch include the following. When the insufficient operation force is the cause of the failure, coordinate control may be performed so that the relative coordinates of the switch and hand member 310 approach each other, or current control may be performed so as to increase the moving speed of hand member 310 in order to increase the pressing force. In addition, in a case where the user touches the pressed switch, the user may be notified without changing the control parameter. When contacting with the switch to be operated fails or when the switch to be operated is scratched, coordinate control may be performed so that the relative coordinates of the switch and hand member 310 approach each other, or notification may be performed to the user.

As described above, according to the present exemplary embodiment, controller 103 performs feedback related to the operation of switch group 500 on the basis of the determination result. As a result, the accuracy of the operation on switch group 500 can be further improved according to the determination result of the switch.

The feedback is adjustment of a control parameter of robot 300 or notification of an operation result to the user. This makes it possible to improve the accuracy of the operation on switch group 500.

Other Exemplary Embodiments

The above exemplary embodiment has exemplified the case in which vibration information is used by the vibration sensor. However, the present invention is not limited to this. For example, a microphone may be used instead of the vibration sensor, and the voice information may be acquired by the microphone. In this case, IF unit 101 may include an audio interface for receiving a detection result by the microphone.

In the above exemplary embodiments, examples of the switch include a toggle switch, a push switch, and a rocker switch. However, the present invention may be applied to other types of switches. For example, a rotary switch or a slide switch may be a target. In this case, hand member 310 may be changed to a shape in which the rotary switch or the slide switch can be operated. For example, when the rotary switch is to be operated, hand member 310 may be provided with two finger portions to sandwich the rotary switch. In addition, the toggle switch, the push switch, and the rocker switch may have various internal structures. For example, the internal structure of each switch may be a spring structure or a seesaw structure using a leaf spring or the like. In addition, each switch is not limited to one involving electrical switching and may be a lever or the like involving mechanical switching.

Furthermore, the above-described embodiment has exemplified the configuration in which the operation result of the switch is determined on the basis of the vibration when the switch is operated by robot 300. The present invention is not limited to this configuration, and the switch may be operated by a person. In this case, for example, a vibration sensor may be installed around the switch, a vibration signal generated when a person operates the switch may be acquired, and the type of the switch operated and the operation result may be determined based on the vibration signal. Further, a simple switch switching may be determined as an operation instead of an operation by a person or a robot.

The above exemplary embodiments may be used in combination with other determination methods. For example, the method may be combined with a method of capturing an image around the switch using an imaging device such as a camera and performing operation determination of the switch on the basis of the image. For example, in a case where determination by an image is difficult, the determination method may be switched to the determination method of the present invention or vice versa. In addition, the robot may be operated using an imaging device such as a camera, and whether or not the operation on the switch has been normally performed may be determined using the determination method of the present invention.

In addition, the present invention determines the state of an object whose state transitions by position switching. In the above embodiment, ON or OFF of the switch has been described as an example of the position. In addition, although the switch has been described as an example of the object, the present disclosure is applicable as long as the state of the object is electrically or mechanically switched depending on the position. In this case, the position of the object is the position of a predetermined mechanism of the object.

Although the position is described as the state of the object, the state of the object may be an abnormality of the object. The abnormality of the object means, for example, that there is no mechanical change in the object or that the object has failed. For example, when the object is a door, the position may be a position at the time of opening or closing or a position of the mechanism depending on the presence or absence of locking. At this time, vibration at the time of opening or closing or at the time of locking is acquired, and it is determined whether the door is normally shut or half-shut.

Another possible implementation includes processing in which a program and an application for implementing the functions according to the one or more exemplary embodiments described above are supplied to a system or an apparatus, by using a network, a storage medium, or the like, and one or more processors in a computer included in the system or the apparatus are caused to read and execute the program and the application.

Alternatively, the embodiment may be implemented as a circuit (for example, an application specific integrated circuit (ASIC) or a field programmable gate array (FPGA)) that implements one or more functions.

Furthermore, the functions described above may be configured on a network using a cloud computing technology. In this case, a terminal device can use the various functions described above over the network.

Although various exemplary embodiments have been described above with reference to the drawings, it goes without saying that the present disclosure is not limited to such examples. It is obvious that those skilled in the art can arrive at various modification examples, modification examples, replacement examples, additional examples, deletion examples, and equivalent examples within the scope described in the claims, and it is understood that these examples naturally belong to the technical scope of the present disclosure. In addition, the elements included in the various exemplary embodiments described above may be combined in any way, within the scope not departing from the gist of the present disclosure.

The present disclosure is useful in a switch operation device for operating various switches.

What is claimed is:

1. A system comprising:
 a determination device;
 a robot; and
 a sensor,
 wherein the robot is configured to operate a target switch;
 wherein the sensor is configured to detect a target vibration signal generated when a position of the target switch is changed by the robot;
 wherein the determination device includes:
 an interface configured to acquire the target vibration signal; and
 a controller configured to: (i) control the robot to change the position of the target switch; and (ii) determine whether or not the operation of the target switch by the robot is successful by comparing the target vibration signal with an output signal from a learned model; and
 wherein the learned model is programmed to:
 learn a training vibration signal of a predetermined switch; and
 output, as the output signal, a signal indicating vibration generated when a position of the predetermined switch is changed.

2. The system according to claim 1, wherein:
 the robot includes a hand portion including a contact surface configured to come into contact with the target switch when the target switch is operated;
 the hand portion further includes:
 a first surface on a same side as the contact surface when viewed from a distal end of the hand portion; and
 a second surface opposite to the first surface; and
 the sensor is on the first surface or the second surface.

3. The system according to claim 1, wherein:
 the robot includes a hand portion including a contact surface, a first surface, and a second surface opposite to the first surface, the contact surface being configured to come into contact with the target switch when the target switch is operated;
 the sensor is on the second surface; and
 the controller is further configured to rotate the hand portion, in accordance with information about the operation of the target switch by the robot, to locate the contact surface on a same side as: (i) the first surface when viewed from a distal end of the hand portion; or (ii) the second surface when viewed from the distal end of the hand portion.

4. The system according to claim 1, wherein the controller is further configured to perform feedback related to the operation of the target switch based on a result of the determination whether or not the operation of the target switch by the robot is successful.

5. The system according to claim 4, wherein the feedback is adjustment of a control parameter of the robot or a notification of an operation result to a user.

6. The system according to claim 1, wherein, the controller is further configured to, upon determination that the operation of the target switch has failed, control the robot to perform the operation of the target switch again.

7. The system according to claim 1, wherein, the controller is further configured to, upon determination that the operation of the target switch has failed, receive again an instruction of the operation of the target switch.

8. The system according to claim 1, wherein:
 the system is configured to be connected to a remote operation device via a network; and
 the controller is configured to control the robot to operate the target switch based on an instruction input via the remote operation device.

9. The system according to claim 1, wherein the target switch includes a spring, and the target vibration signal includes vibration generated by the spring when the position of the target switch is changed.

10. The system according to claim 1, wherein the controller is further configured to determine an operation result of the target switch based on the target vibration signal and a predefined rule.

11. The system according to claim 1, wherein the controller is further configured to determine a type of the target switch.

12. The system according to claim 1, wherein the target switch includes a toggle switch, a push switch, or a rocker switch.

13. The system according to claim 1, further comprising a memory configured to record an operation result by the controller.

14. A determination method comprising:
 operating, by a robot, a target switch;
 detecting, by a sensor, a target vibration signal generated when a position of the target switch is changed by the robot;
 acquiring, by an interface, the target vibration signal; and
 controlling, by a controller, the robot to change the position of the target switch; and
 determining, by the controller, whether or not the operation of the target switch by the robot is successful by comparing the target vibration signal with an output signal from a learned model,
 wherein the learned model is programmed to:
 learn a training vibration signal of a predetermined switch; and
 output, as the output signal, a signal indicating vibration generated when a position of the predetermined switch is changed.

* * * * *